Feb. 26, 1963 A. E. HARROLD ET AL 3,078,466

MACHINES FOR MOUNTING ELECTRICAL COMPONENTS ON BASE MEMBERS

Filed Dec. 21, 1959 11 Sheets-Sheet 1

INVENTORS
ARTHUR EDWARD HARROLD
AND CHARLES SPROSON SMITH

MACHINES FOR MOUNTING ELECTRICAL COMPONENTS ON BASE MEMBERS

Filed Dec. 21, 1959 11 Sheets-Sheet 2

INVENTORS
ARTHUR EDWARD HARROLD
and CHARLES SPROSON SMITH

BY [signature]
ATTORNEYS

Feb. 26, 1963 A. E. HARROLD ETAL 3,078,466

MACHINES FOR MOUNTING ELECTRICAL COMPONENTS ON BASE MEMBERS

Filed Dec. 21, 1959 11 Sheets-Sheet 3

INVENTORS
ARTHUR EDWARD HARROLD
and CHARLES SPROSON SMITH
BY [signature]
ATTORNEYS

MACHINES FOR MOUNTING ELECTRICAL COMPONENTS ON BASE MEMBERS

Filed Dec. 21, 1959 11 Sheets-Sheet 4

INVENTORS
ARTHUR EDWARD HARROLD
and CHARLES SPROSON SMITH
BY
ATTORNEYS

MACHINES FOR MOUNTING ELECTRICAL COMPONENTS ON BASE MEMBERS

Filed Dec. 21, 1959 11 Sheets-Sheet 5

INVENTORS
ARTHUR EDWARD HARROLD
and CHARLES SPROSON SMITH

BY [signature]
ATTORNEYS

INVENTORS
ARTHUR EDWARD HARROLD
and CHARLES SPROSON SMITH
BY [signature]
ATTORNEYS INVENTORS
ARTHUR EDWARD HARROLD
and CHARLES SPROSON SMITH
BY [signature] [signature]
ATTORNEYS Feb. 26, 1963 A. E. HARROLD ET AL 3,078,466

MACHINES FOR MOUNTING ELECTRICAL COMPONENTS ON BASE MEMBERS

Filed Dec. 21, 1959 11 Sheets-Sheet 8

INVENTORS
ARTHUR EDWARD HARROLD
AND CHARLES SPROSON SMITH

MACHINES FOR MOUNTING ELECTRICAL COMPONENTS ON BASE MEMBERS

Filed Dec. 21, 1959 11 Sheets-Sheet 9

INVENTORS
ARTHUR EDWARD HARROLD
AND CHARLES SPROSON SMITH

MACHINES FOR MOUNTING ELECTRICAL COMPONENTS ON BASE MEMBERS

Filed Dec. 21, 1959 11 Sheets-Sheet 10

INVENTORS
ARTHUR EDWARD HARROLD
and CHARLES SPROSON SMITH
BY [signature]
ATTORNEYS

MACHINES FOR MOUNTING ELECTRICAL COMPONENTS ON BASE MEMBERS

INVENTORS
ARTHUR EDWARD HARROLD
and CHARLES SPROSON SMITH
BY [signature]
ATTORNEYS 3,078,466
Patented Feb. 26, 1963

3,078,466

MACHINES FOR MOUNTING ELECTRICAL COMPONENTS ON BASE MEMBERS

Arthur Edward Harrold, Coventry, and Charles Sproson Smith, Birmingham, England, assignors to The General Electric Company Limited, London, England Filed Dec. 21, 1959, Ser. No. 860,945
2 Claims. (Cl. 1—323)

This invention relates to machines for mounting electrical components on base members, for example "printed" circuit panels.

The invention is concerned in particular with machines of the kind designed to mount on base members electrical components each having a body from which a pair of wire leads project in opposite directions.

According to the invention, a machine of the kind specified includes an insertion head comprising two bending mechanisms respectively operable to bend the two leads of an electrical component so that the ends of the leads are pointed towards a base member on which the component is to be mounted, a reciprocable forcing mechanism for moving a component towards the base member after its leads have been bent, and means for adjusting the spacing apart of the two bending mechanisms in a direction perpendicular to the direction of reciprocation of the forcing mechanism so that components having bodies of considerably different dimensions can be mounted on a base member by means of the machine.

In a preferred embodiment of the invention, the forcing mechanism includes two forcing members respectively arranged to engage the two leads of a component, and the insertion head includes means for adjusting the spacing apart of the two forcing members in a manner similar to that in which the spacing apart of the two bending mechanisms is adjusted.

Preferably, a machine in accordance with the invention includes a plurality of magazines at least some of which are for components having bodies of different dimensions, automatic feeding means for feeding a series of components one at a time in a variable preselected sequence from the magazines to the insertion head, and automatic means for controlling the operation of said adjusting means so as to enable the insertion head to mount said sequence of components in turn on a base member.

An automatic component mounting machine in accordance with the invention will now be described by way of example with reference to the accompanying drawings, in which.

Figures 6, 7:
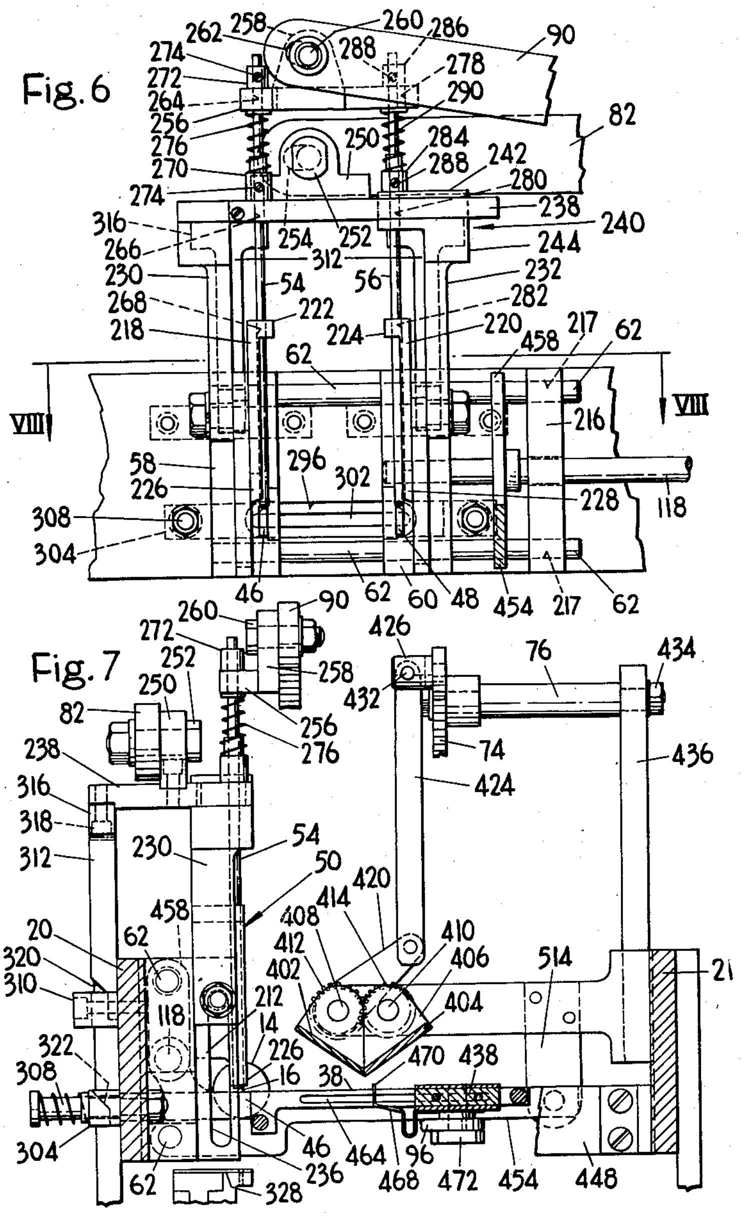
FIGURE 6 is a front elevation of the insertion head 44.
Figure 8:
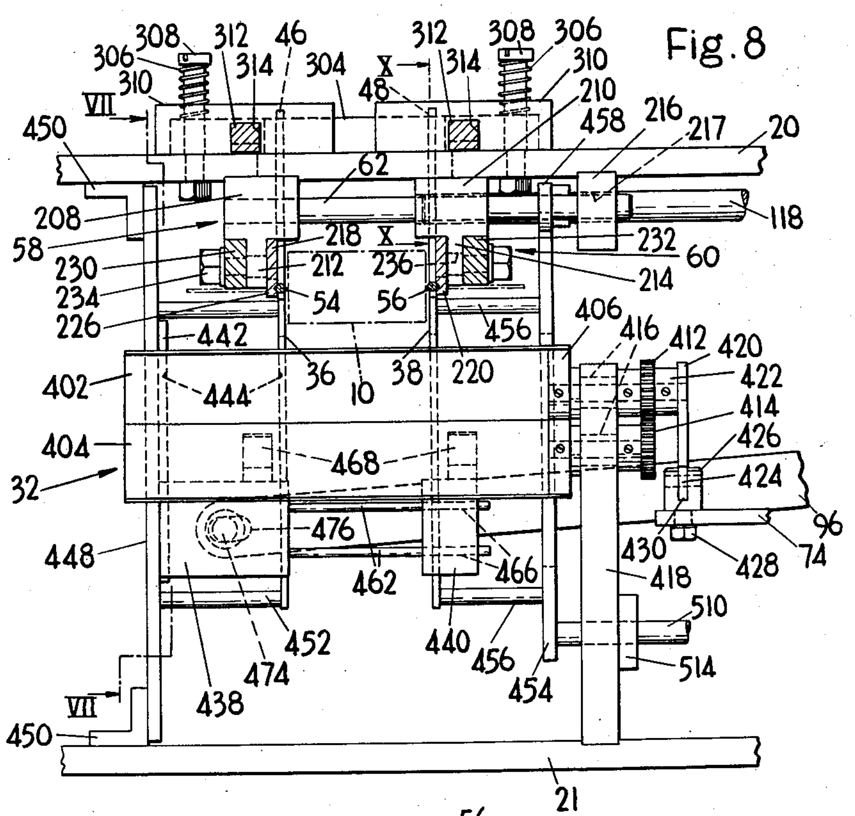
Figures 9, 10:
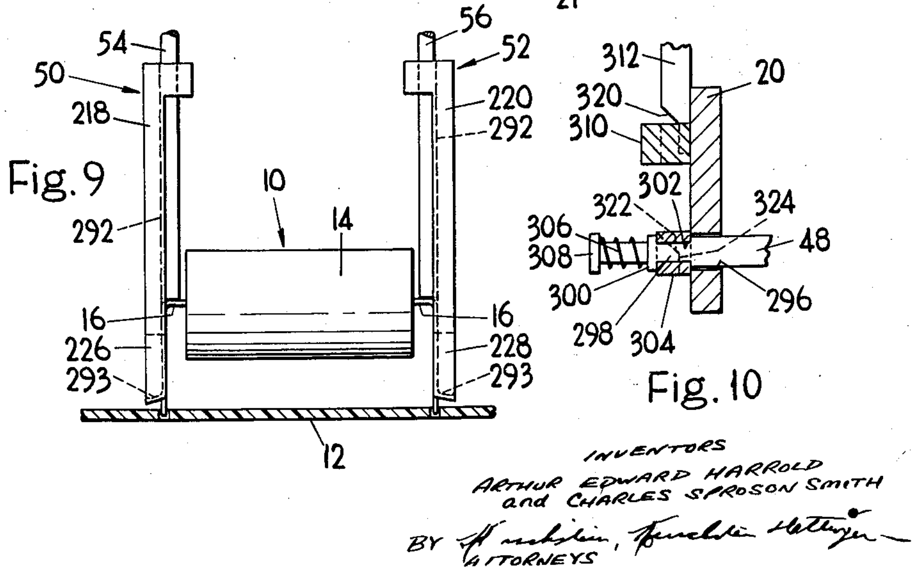
Figures 11, 12, 13:
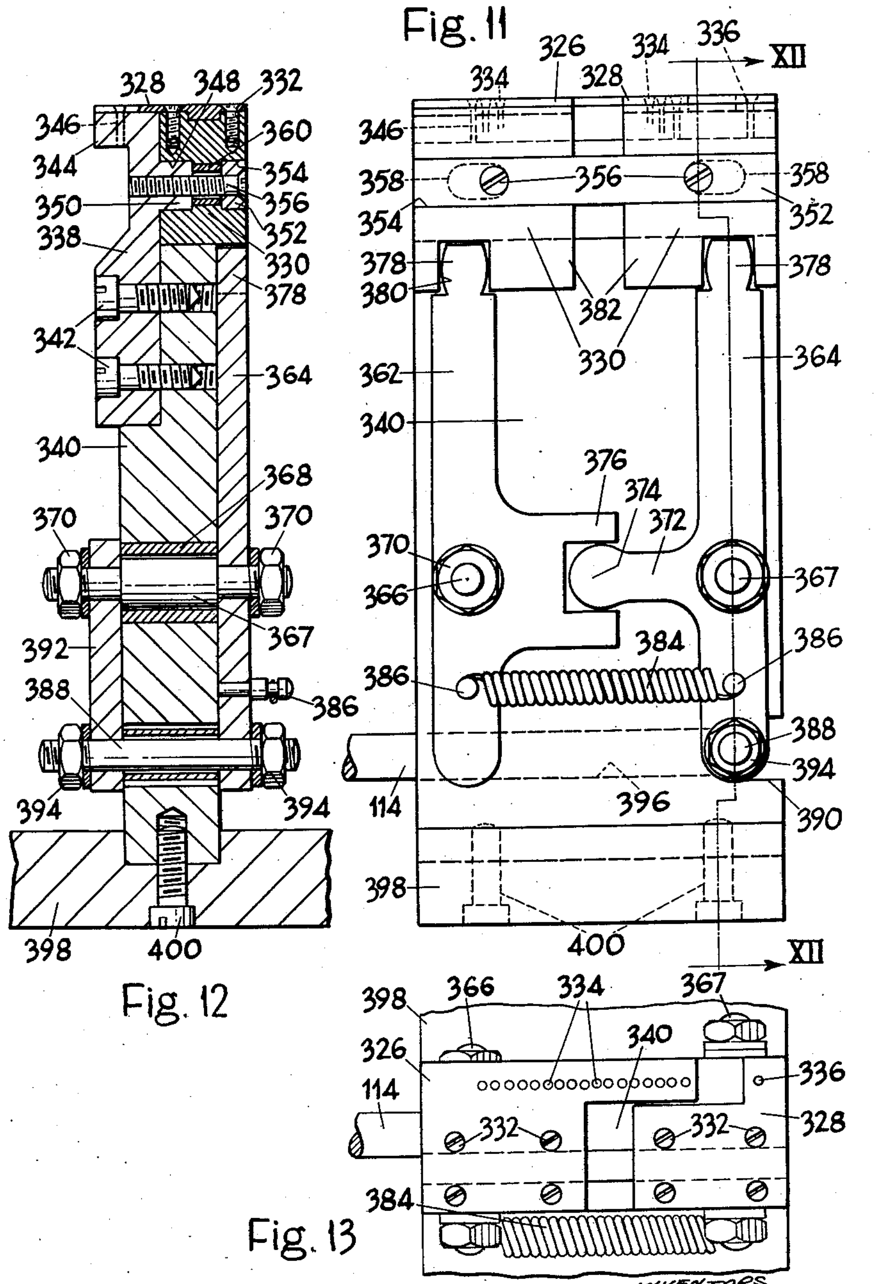
Figure 14:
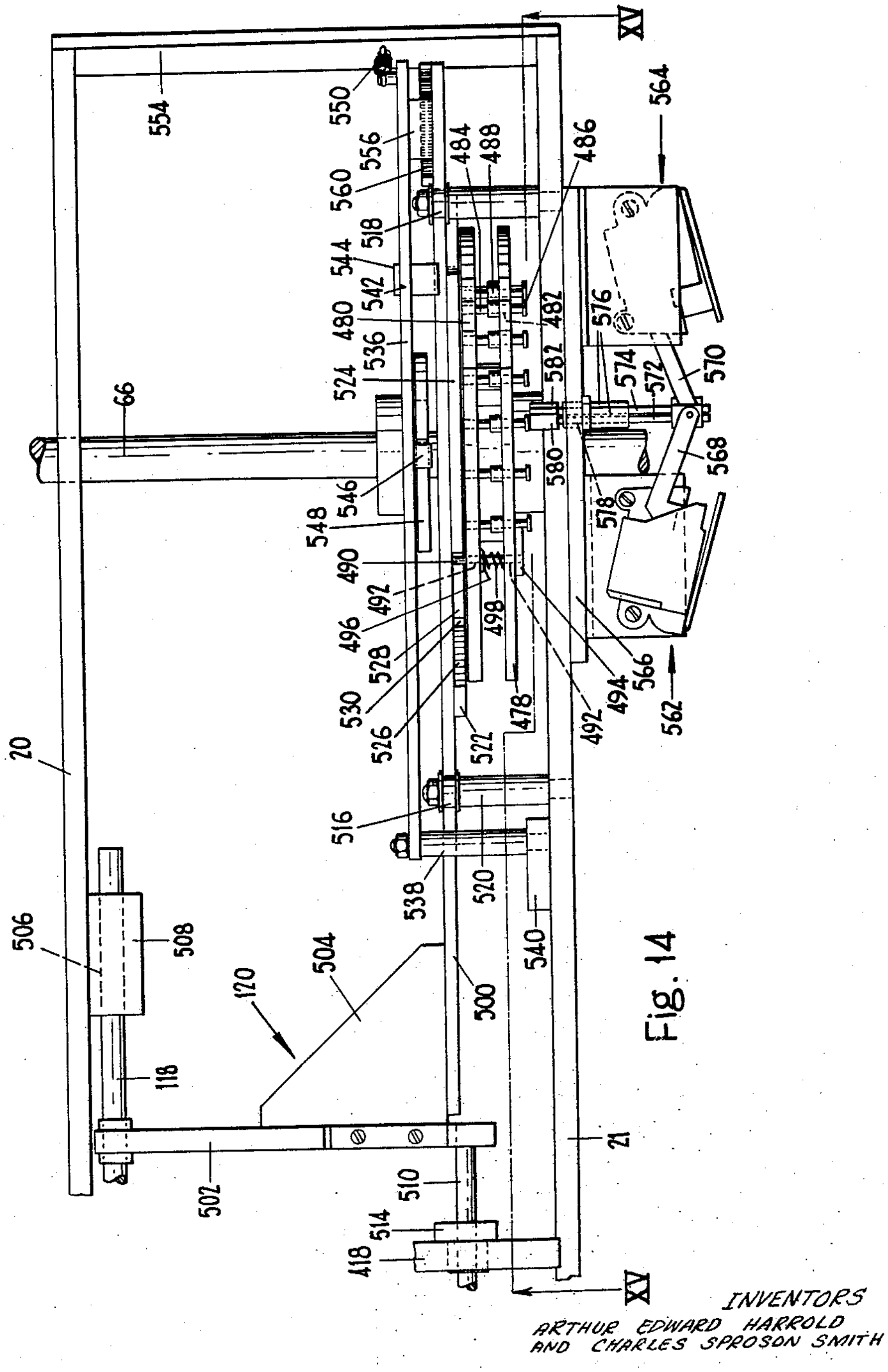
Figure 15:
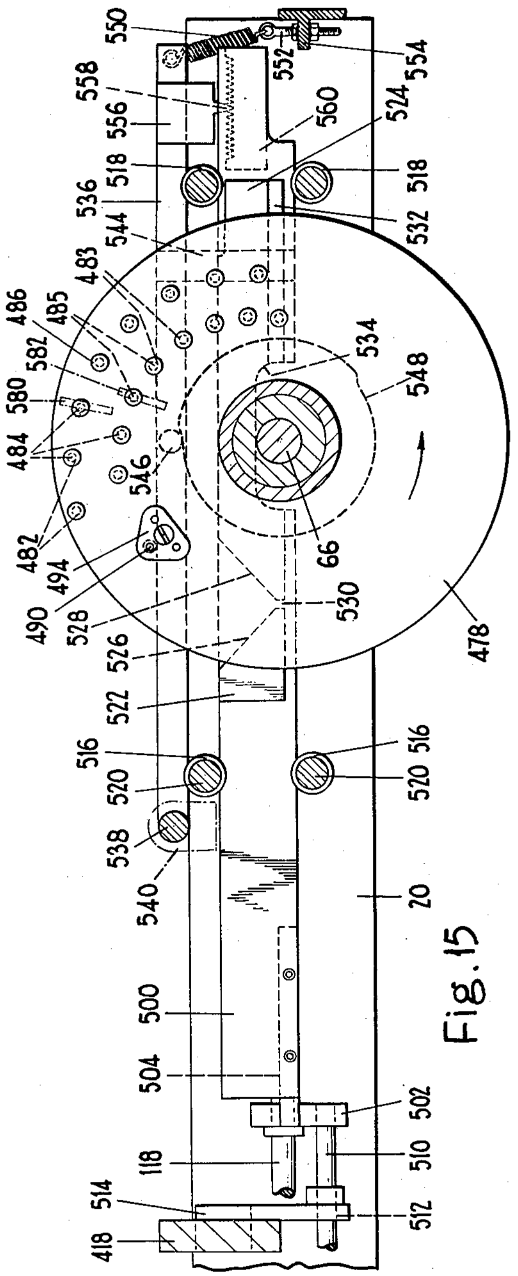
Figure 17:
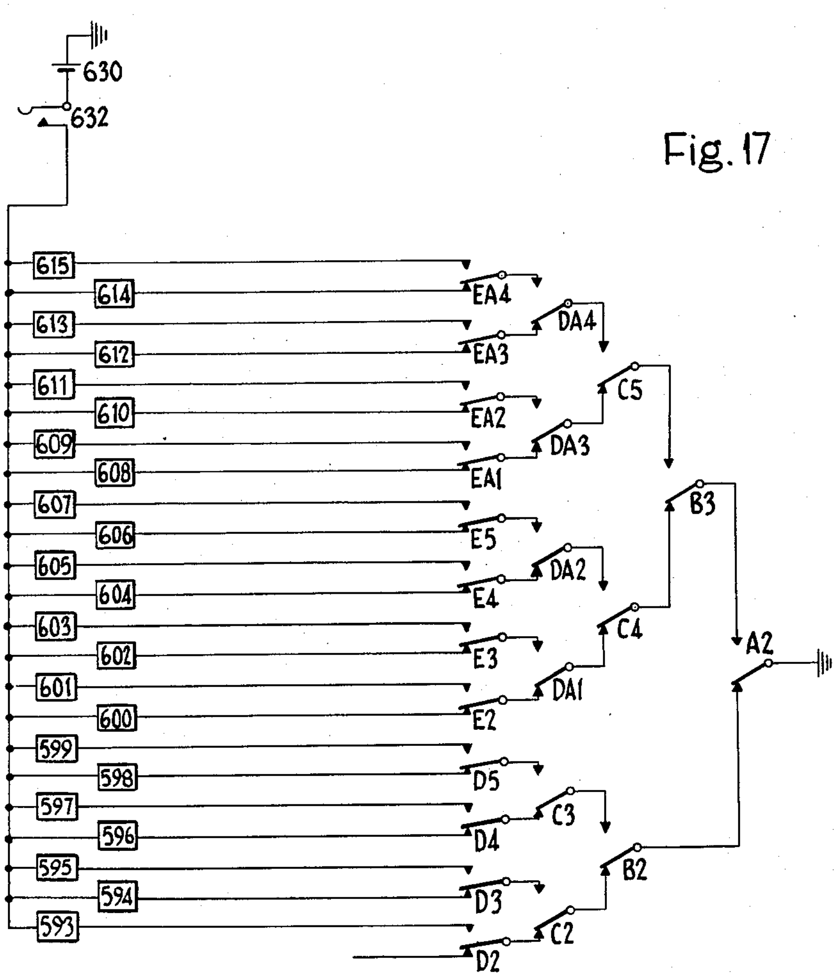
Figure 16:
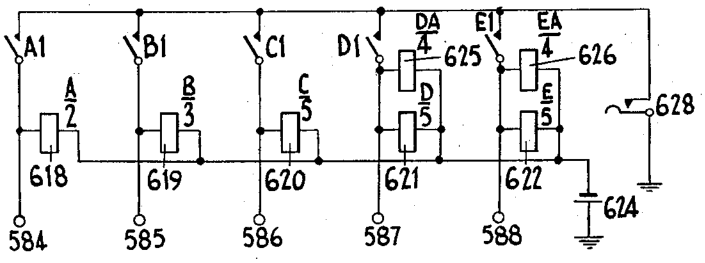
Figures 18, 19:
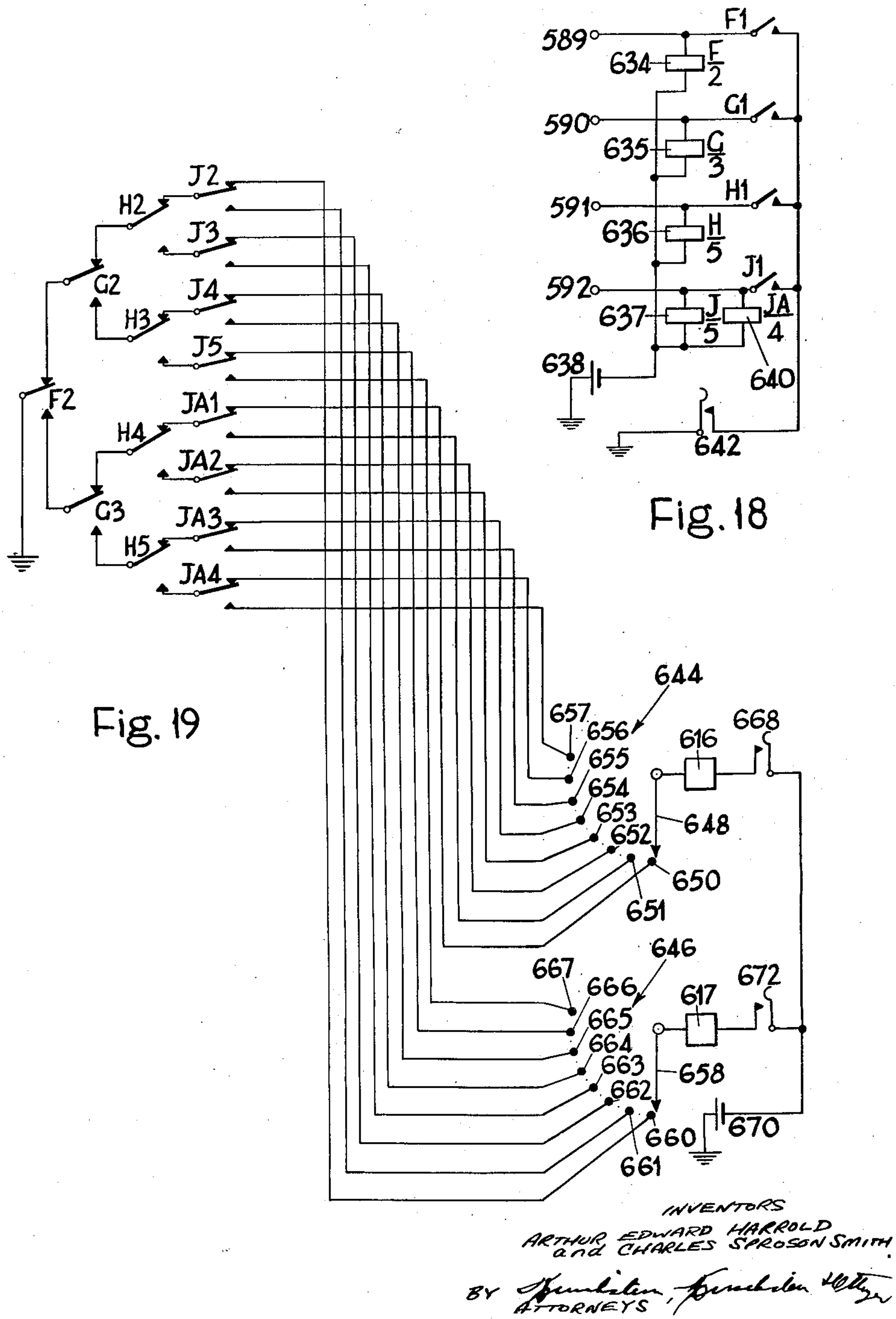

FIGURE 7 is a sectional side elevation of the insertion head 44, the feed mechanism 34, and the hopper 32 and its associated mechanism, the section being taken along the line VII—VII of FIGURE 8;

FIGURE 8 is a sectional plan view of the parts of the machine shown in FIGURE 7, the section being taken along the line VIII—VIII of FIGURE 6;

FIGURE 9 is an enlarged diagrammatic view of a part of the insertion head 44 at a particular stage during the cycle of operation of the machine;

FIGURE 10 is an enlarged sectional side elevation of a part of the insertion head 44, the section being taken along the line X—X of FIGURE 8;

FIGURE 11 is an enlarged rear elevation of the cutting and clinching mechanism;

FIGURE 12 is a sectional side elevation of the cutting and clinching mechanism, the section being taken along the line XII—XII of FIGURE 11;

FIGURE 13 is a plan view of the cutting and clinching mechanism;

FIGURE 14 is a plan view of the rotating disc assembly 116;

FIGURE 15 is a sectional front elevation of the rotating disc assembly 116, the section being taken along the line XV—XV of FIGURE 14;

FIGURES 16 and 17 are circuit diagrams of electrical circuit arrangements for controlling the energisation of the electro-magnet assemblies 158 associated with the magazines 22; and FIGURES 18 and 19 are circuit diagrams of electrical circuit arrangements for controlling the energisation of the electro-magnets 562 and 564 associated with the rotating disc assembly 116.

Figures 1, 2:
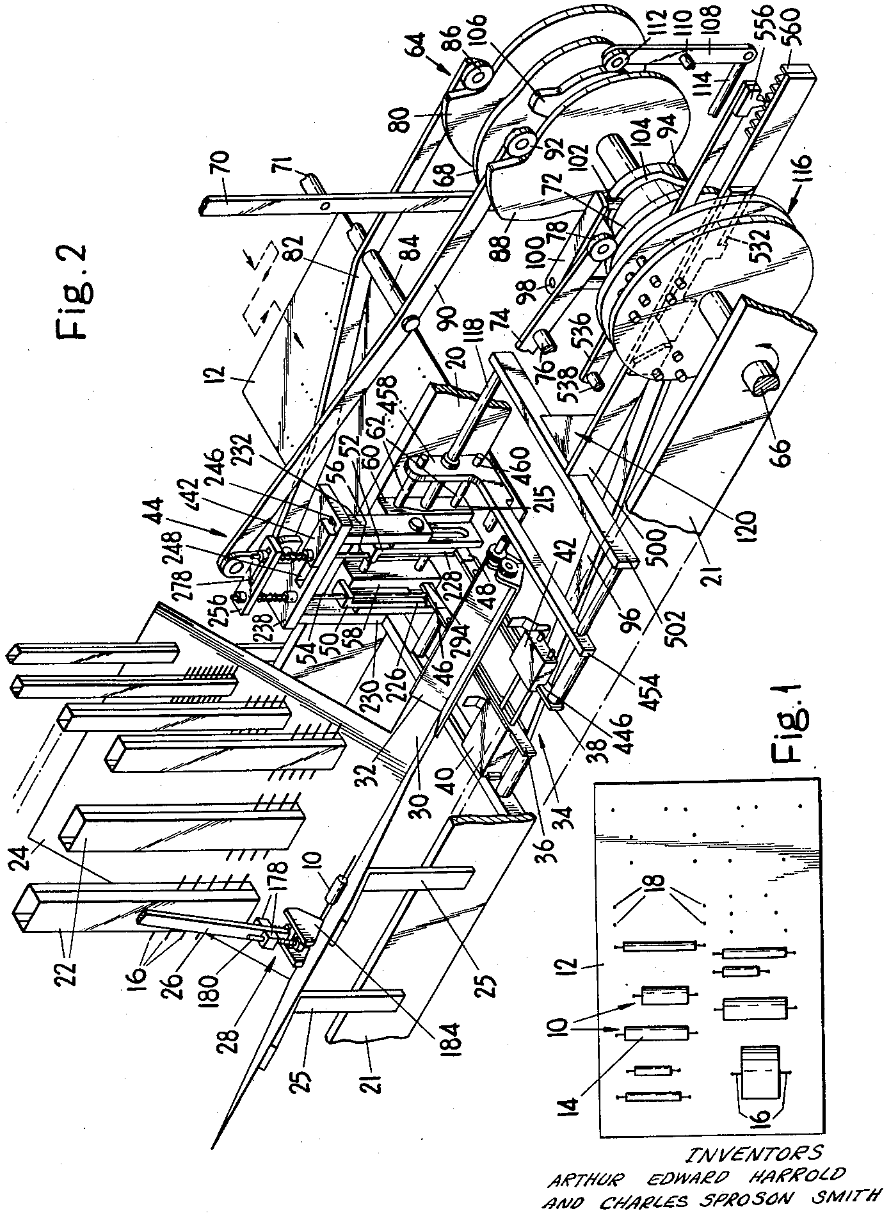
FIGURE 1 is a plan view of a printed circuit panel having various components mounted on it.
FIGURE 2 is a diagrammatic perspective view of substantially the whole machine, parts of the machine being shown broken away for the sake of clarity.

Referring to the drawings, the component mounting machine is adapted to mount electrical components 10 on to printed circuit panels 12 (an example of which is shown in FIGURE 1), the components 10 being of the kind having a circular cylindrical body 14 and a pair of wire leads 16 projecting from opposite ends of the body 14 coaxial with the body 14. A number of pairs of small holes 18 are formed in each panel 12, each pair of holes 18 being adapted to accommodate the leads 16 of a component 10. The machine is adapted to mount several eletcrical components 10 on the same printed circuit panel 12, and is designed to mount the components 10 at various pre-determined places on the panel 12 with the axes of the bodies 14 of the components 10 parallel with one another. Also, the machine is capable of handling components 10 whose bodies 14 have considerably different dimensions, as is clearly shown in FIGURE 1.

*General Description*

The machine and its operation will first be briefly described with reference to FIGURE 2 of the drawings, and the various parts of the machine will be dealt with in detail later. It should be emphasised that FIGURE 2 is a diagrammatic view intended to illustrate the general operation of the whole machine, certain details of the machine having been simplified or distorted in this figure to facilitate comprehension.

Referring to FIGURE 2, the machine includes two horizontally extending base members 20 and 21 mounted on a table (not shown in this figure). At the left of the machine (with respect to FIGURE 2), are mounted a number of magazines 22 each of which holds a column of about one hundred components 10; the magazines 22 respectively accommodate components 10 of different types, some of the different types of components 10 respectively having bodies 14 of considerably different dimensions, but the leads 16 of all the types of components 10 having the same length.

The magazines 22 are mounted above a trough 24 having a V-shaped cross-section and made of sheet metal, the trough 24 being supported on the base members 20 and 21 by means of brackets 25; the arrangement is such that, when a component 10 is released from the lower end of one of the magazines 22, the component 10 slides down the sides of the trough 24 into a position in the angle of the trough 24 such as is occupied by the component 10 shown in FIGURE 2. After a component 10 is released from a magazine 22, it is moved from left to right (with respect to FIGURE 2) along the trough 24 by means of a swinging arm 26 provided with a spring-loaded lower portion 28, the component 10 being moved first on to an extension 30 of the trough 24 and then on to a hopper 32 which abuts against, and is normally in register with, the extension 30.

After a component 10 has been pushed on to the hopper 32, the hopper 32 opens and allows the component 10 to drop a short distance on to a feed mechanism generally designated 34. The feed mechanism 34 includes two horizontally extending and parallel rails 36 and 38 which respectively support the lead wires 16 of a component 10 dropped on to the feed mechanism 34; the rails 36 and 38 are disposed transverse to the length of the hopper 32 so that the rails 36 and 38 support the component 10 with the axis of the component 10 perpendicular to the rails 36 and 38.

The feed mechanism 34 also includes two pusher members 40 and 42 which are arranged to push the component 10 along the rails 36 and 38 towards an insertion head generally designated 44. The insertion head 44 includes a pair of bending mechanism which respectively incorporate a pair of horizontally extending anvil arms 46 and 48 which are in register with, and which normally abut against, corresponding ends of the rails 36 and 38 as shown in FIGURE 2, and the component 10 is pushed along the rails 36 and 38 on to the anvil arms 46 and 48. The two bending mechanisms also respectively incorporate a pair of vertically extending bending members 50 and 52. The insertion head 44 also inclldes a pair of spring-loaded vertically extending forcing rods 54 and 56 which are respectively associated with the bending members 50 and 52, the arrangement being such that normally the anvil arms 46 and 48 are respectively disposed immediately below the forcing rods 54 and 56.

The anvil arms 46 and 48 are respectively mounted in two support members 58 and 60 which also respectively serve as guides for the bending members 50 and 52. The support member 58 is secured to the base member 20, while the other support member 60 is slidably mounted on a pair of guide rods 62 so as to be movable in a horizontal direction towards or away from the support member 58. The arrangement is such that movement of the support member 60 also brings about a corresponding movement of the anvil arm 48, the bending member 52 and the forcing rod 56, and thus, by adjusting the spacing apart of the support members 58 and 60, the spacings apart of the anvil arms 46 and 48, the bending members 50 and 52, and the forcing rods 54 and 56 are also adjusted in the same manner. The rail 38 and the pusher member 42 are also connected to the movable support member 60 for movement therewith.

During each cycle of operation of the machine, the spacing apart of the support members 58 and 60 is adjusted as required by a suitable amount so as to enable the feed mechanism 34 and the insertion head 44 to accommodate the next component 10 to be fed to the feed mechanism 34 and the insertion head 44, this spacing being adjustable in steps of 0.1 inch; it will be appreciated that the spacing apart of the anvil arms 46 and 48 and of the rails 36 and 38 should be so adjusted that the distance between the arms 46 and 48 and between the rails 36 and 38 is greater than the length of the body 14 of this component 10.

After a component 10 has been pushed on to the anvil arms 46 and 48, the bending arms 50 and 52 descend so as to bend the wires 16 of the component 10 over the arms 46 and 48 in such a manner that the wires 16 point vertically downwards. The arms 46 and 48 are then withdrawn from beneath the wires 16, and the forcing rods 54 and 56 descend so as to push the downwardly projecting ends of the wires 16 through the relevant holes 18 of a panel 12 positioned beneath the insertion head 44. Those parts of the wires 16 projecting below the panel 12 are then cut to the required length and bent over against the underside of the panel 12 (this being the side on which the metallic pattern of the panel 12 is formed) by means of a cutting and clinching mechanism (not seen in FIGURE 2).

The cycle of operation is then repeated, another component 10 being mounted at another position on the printed circuit panel 12. The panel 12 is moved automatically beneath the insertion head 44 from one position at which a cmponent 10 is mounted to another by means of a mechanism not shown; the panel 12 can be moved both in directions perpendicular, and parallel, to the direction of movement of the support member 60, the general direction of movement of the panel 12 being indicated by the dotted arrowed line in FIGURE 2.

Movements of the various movable parts described above is controlled by means of a camshaft assembly 64 which includes a camshaft 66 driven by an electric motor (not shown). Thus, the operation of the swinging arm 26 is controlled by a cam 68, the linkage between the arm 26 and the cam 68 including a lever 70 pivoted about a spindle 71; the operation of the hopper 32 is controlled by a cam 72, the linkage between the hopper 32 and the cam 72 including a lever 74 pivoted about a spindle 76 and having mounted at one end a follower roller 78 which is arranged to bear resiliently against the cam 72; the operation of the bending members 50 and 52 is controlled by a cam 80, the linkage between the bending members 50 and 52 and the cam 80 including a lever 82 pivoted about a spindle 84 and having mounted at one end a follower roller 86 which is arranged to bear resiliently against the cam 80; the operation of the forcing rods 54 and 56 is controlled by a cam 88, the linkage between the forcing rods 54 and 56 and the cam 88 including a lever 90 also pivoted about the spindle 84 and having mounted at one end a follower roller 92 which bears resiliently against the cam 88; the operation of the pusher members 40 and 42 is controlled by a barrel cam 94, and the linkage between the pusher members 40 and 42 consists of a lower horizontal lever 96, a vertical rod 98, and an upper horizontal lever 100 at one end of which is mounted a follower stud 102 which engages in a groove 104 formed in the cam 94, the rod 98 being mounted in bearings (not shown) and the levers 96 and 100 being linked by the rod 98 for rotational movement about the axis of the rod 98; and the operation of the cutting and clinching mechanism is controlled by a cam 106, the linkage between the cutting and clinching mechanism and the cam 106 including a generally vertically extending lever 108 pivoted about a spindle 110, and the lever 108 having mounted at one end a follower roller 112 which is arranged to bear resiliently against the cam 106 and being pivotably linked at its other end to a generally horizontally extending rod 114. It should be understood that the follower rollers 78, 86, 92 and 112 are arranged to bear resiliently against the relevant cams 72, 80, 88 and 106 by means of springs (not shown).

Horizontal movement of the movable support member 60 is controlled by a rotating disc assembly 116, and the linkage between the member 60 and the assembly 116 includes a rod 118 which is connected to a connecting member 120, the member 120 being actuated in operation by the assembly 116 in a manner to be described in detail later.

The release of components 10 from the magazines 22, the operation of the rotating disc assembly 116, and the movement of the panel 12 beneath the insertion head 44 are controlled by an electrical system (not shown in FIGURE 2), this system including a punched card reader into which is fed in operation a punched card containing the required information for controlling the operation of the machine so that components 10 are released from the magazines 22 and fed to the insertion head 44 in a preselected sequence, the insertion head 44 being adjusted correspondingly to enable it to mount the sequence of components 10 in turn on the panel 12.

*Magazines*

Figure 3:
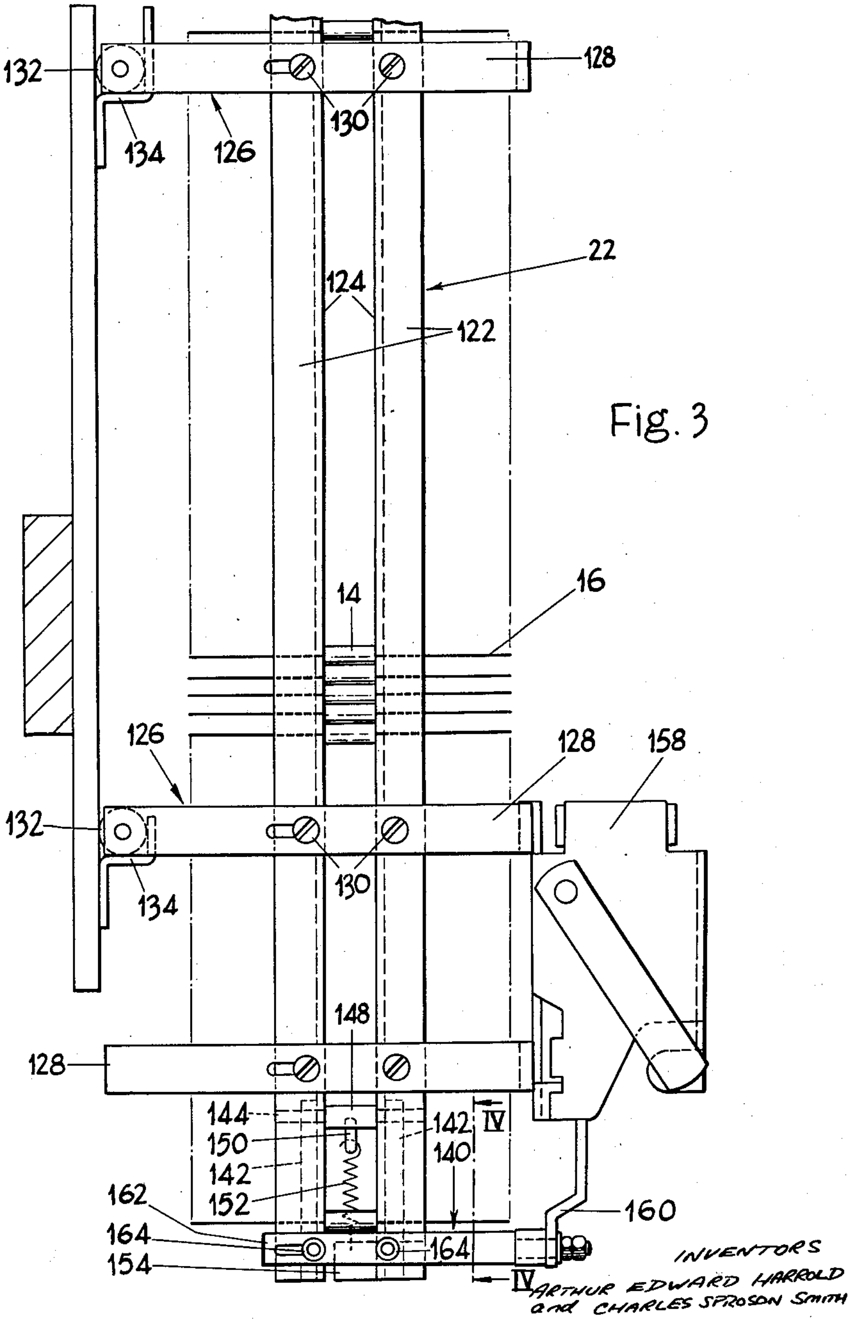
FIGURE 3 is an enlarged elevation of the lower part of one of the magazines 22.
Figure 4:
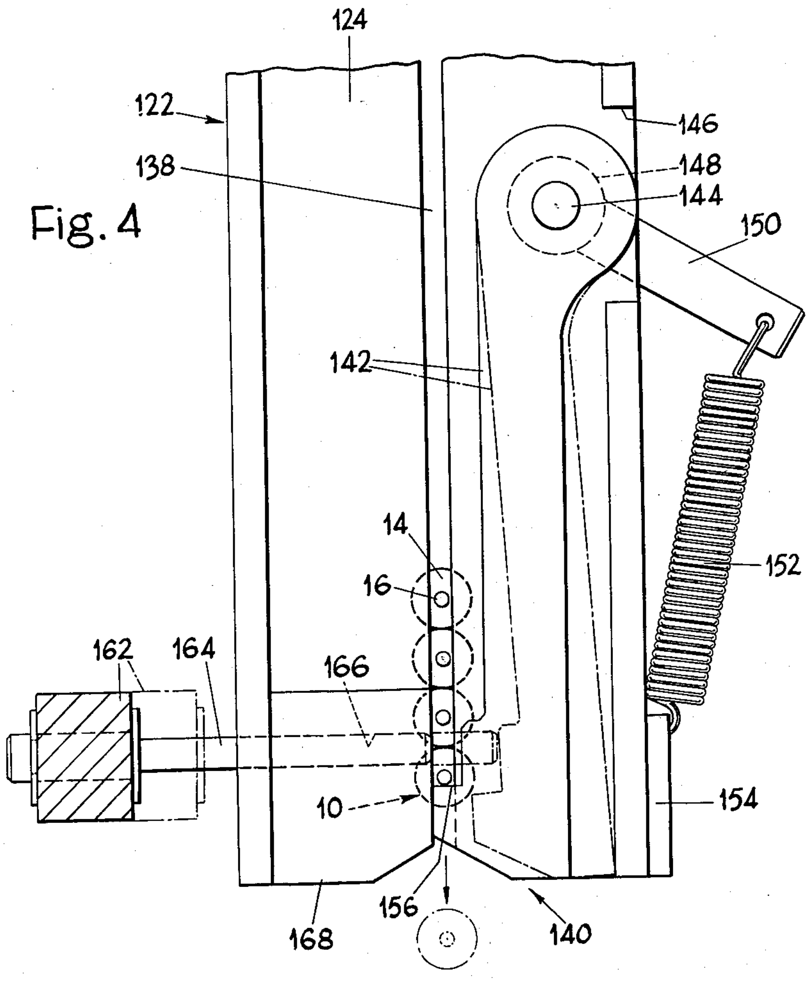
FIGURE 4 is an enlarged sectional elevation of the lower part of the magazine 22 shown in FIGURE 3, the section being taken along the line IV—IV of FIGURE 3.

The magazines 22 will now be described in detail with reference to FIGURES 3 and 4 wherein is shown a particular type of magazine 22. The magazine 22 includes two vertically extending channel members 122 of U-shaped cross-section, the walls 124 of the members 122 which constitute the bases of the channels being in register with, and adjacent to, one another. The members 122 are secured together by means of a number of U-shaped brackets 126 the arms 128 of which are respectively secured to corresponding pairs of the sides of the members 122 by means of screws 130. The ends of the arms 128 of two of the brackets 126 are joined by means of rods 132, and the magazine 22 is supported by virtue of the rods 132 resting in hooked members 134 secured to a support 136 for the magazine 22. Two vertical narrow slots 138 are respectively centrally formed in the walls 124, and the arrangement is such that, when full, the magazine 22 contains a vertical column of components 10 the leads 16 of which are respectively accommodated in the slots 138 and the bodies 14 of which extend between the walls 124.

The magazine 22 is provided at its lower end with a component release mechanism 140, the mechanism 140 including two generally vertically extending arms 142 which are mounted on, and which are pivotable about the axis of, a spindle 144, and which are respectively disposed in the channel members 122; those parts of the arms 142 adjacent the spindle 144 respectively project into two cut-away portions 146 formed in the sides of one of the channel members 122. A circular cylindrical spacing member 148, which is secured to the spindle 144 for rotational movement with the arms 142, extends between the walls 124, and a lever 150 projects from the spacing member 148. The arms 142 are biased in a clockwise direction (with respect to FIGURE 4) by means of a tensioned spring 152 the ends of which are respectively secured to the free end of the lever 150 and to a bracket 154 secured to the lower end of one side of one of the members 122. Each arm 142 has a shoulder 156 formed adjacent its lower end, and normally the arms 142 are in the position shown in FIGURE 4 with the column of components 10 contained in the magazine 22 being supported by virtue of the leads 16 of the lowermost component 10 respectively resting on the shoulders 156.

Release of a component 10 from the magazine 22 is controlled by an electromagnet assembly 158 mounted on the two lowermost brackets 126. The electromagnet assembly 158 includes an actuating arm 160 which moves upon energisation of the assembly 158. A connecting member 162 is secured to the free end of the arm 160, and two rods 164 are secured to the member 162. The rods 164 respectively pass through two holes 166 formed in two guide blocks 168, the blocks 168 being respectively secured inside the lower ends of the channel members 122 and being disposed between the slots 138 and those sides of the members 122 adjacent the connecting member 162. Normally the rods 164 are in the position shown in FIGURE 4, but when the electromagnet assembly 158 is energised, the rods 164 are moved from left to right (with respect to FIGURE 4) by the arm 160 and the connecting member 162 into the position shown in chain-dotted outline in FIGURE 4, thereby pivoting the arms 142 in an anticlockwise direction into the position also shown in chain-dotted outline in FIGURE 4. Thus, when the electromagnet assembly 158 is energised, the shoulders 156 are moved from beneath the lowermost component 10 in the magazine 22 thereby allowing this component 10 to drop out of the bottom of the magazine 22 and into the trough 24; the rest of the components 10 contained in the magazine 22 are prevented from falling out of the magazine 22 by virtue of the leads 16 of the lowermost component 10 remaining in the magazine 22 respectively resting on the rods 164. When the electromagnet assembly 158 is de-energised, the rods 164 move from right to left (with respect to FIGURE 4) thereby allowing the shoulders 156 of the arms 142 to move back into their normal position under the influence of the spring 152 so as to support the leads 16 of the lowermost component 10 in the magazine 22.

*Swinging Arm Mechanism*

Figure 5:
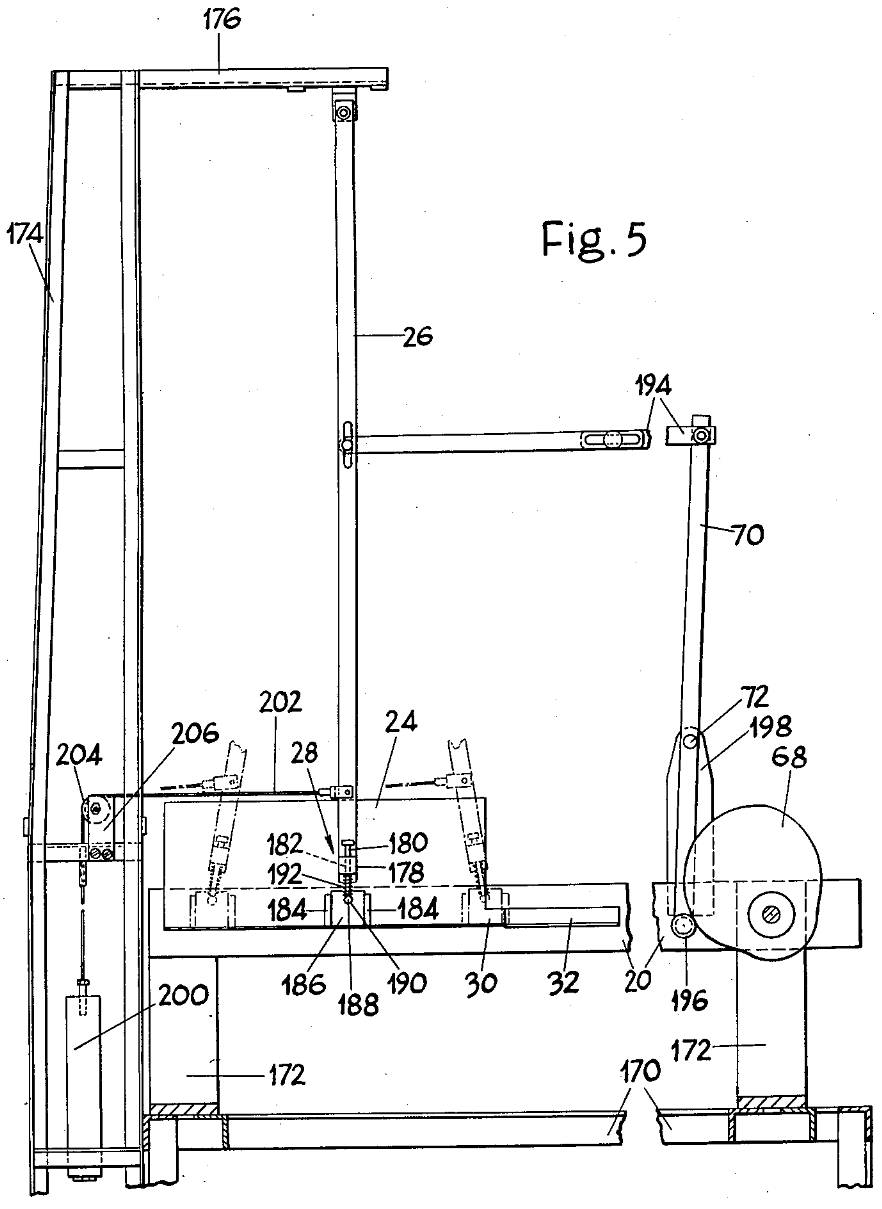
FIGURE 5 is a front elevation, shown partly broken away, of the swinging arm 26 and its associated mechanism.

Referring now particularly to FIGURES 2 and 5, the base members 20 and 21 are supported on a table 170 by means of struts 172, and a vertically extending framework 174 is secured to the left-hand side (with respect to FIGURE 5) of the table 170. A horizontally extending support member 176 is secured to the upper end of the framework 174, and the upper end of the swinging arm 26 is pivotably connected to the member 176.

A pair of blocks 178 (both of which are seen in FIGURE 2) are secured on either side of the swinging arm 26 adjacent its lower end, and two pins 180 respectively pass through, and are sliding fits with respect to, two holes 182 formed in the blocks 178. The lower portion 28 of the swinging arm 26 includes two wedge-shaped members 184 made of synthetic resin which are secured to a central block 186. A horizontal spindle 188 is a rotatable fit in a hole 190 formed in the block 186, and the lower ends of the pins 180 are respectively secured to the ends of the spindle 188. A compressed spring 192 surrounds each pin 180, the ends of the spring 192 respectively bearing against the underside of the relevant block 178 and against the relevant end of the spindle 188. Thus, the wedge-shaped members 164 bear resiliently against the inner surface of the trough 24, and, when the swinging arm 26 is moved from the central position shown in FIGURE 5, the pins 180 are forced downwardly through the blocks 178 by means of the springs 192 so as to maintain the wedge-shaped members 184 in contact with the trough 24.

The upper end of the lever 70 is pivotably connected to one end of a connecting member 194 the other end of which is pivotably connected to a central part of the swinging arm 26. A follower roller 196 is mounted on the lower end of the lever 70 and is caused to bear against the cam 68, the lever 70 being pivotable about the spindle 72 which is mounted on a support 198 secured to the support member 20. The lever 70 is biased in an anticlockwise direction (with respect to FIGURE 5) so as to maintain the follower roller 196 in contact with the cam 68 by means of a weight 200 attached to one end of of a wire 202, the wire 202 passing over a pulley 204 mounted on a bracket 206, and the other end of the wire 202 being secured to a point on the swinging arm 26 near its lower end. The shape of the cam 68 is such that, during each cycle of operation of the machine, the lower portion 28 of the swinging arm 26 moves from left to right (with respect to FIGURE 5) so as to push a component 10 on to the hopper 32, and is then caused to return to its original position adjacent the left-hand end of the trough 24. It will be appreciated that, since the leads of all the components 10 are of the same length, when a component 10 has been moved on to the hopper 32 by the swinging arm 26, the left-hand end (with respect to FIGURE 2) of the body 14 of the component 10 is in a fixed position with respect to the fixed rail 36, this position being chosen so that when the hopper 32 opens the component 10 will drop on to the rails 36 and 38 with its body 14 disposed substantially symmetrically between them.

*Insertion Head*

The insertion head 44 will now be described with particular reference to FIGURES 2, 6, 7, 8, 9 and 10. The support members 58 and 60 are of generally T-shaped cross-section (as is clearly seen in FIGURE 8), the members 58 and 60 respectively comprising two blocks 208 and 210 of rectangular cross-section from which respectively project two narrow projections 212 and 214. The block 208 is secured to the base member 20, and corresponding ends of the guide rods 62 are secured in the block 208. The rods 62 pass through, and are sliding fits with respect to, two horizontally extending holes 215 (see FIGURE 2) formed in the block 210, and the support member 60 can move relative to the base member 20 by sliding along the guide rods 62. Movement of the support member 60 is controlled by the connecting rod 118 one end of which is secured inside the block 210. The rods 62 and 118 are slidably supported by means of a bracket 216 secured to the base member 20, the rods 62 and 118 respectively passing through three holes 217 formed in the bracket 216.

The major part of the bending members 50 and 52 are respectively formed by two vertically extending and parallel flat bars 218 and 220, two horizontal flanges 222 and 224 being formed integral with the tops of the bars 218 and 220 and projecting towards each other, and two downwardly projecting members 226 and 228 being formed integral with the front lower edges of the bars 218 and 220. (It should be understood that in this specification the terms "front" and "rear" are used with reference to FIGURE 2.) The bending members 50 and 52 are respectively disposed in sliding contact with the inner faces of the projections 212 and 214, and two vertically extending supports 230 and 232 are respectively disposed in sliding contact with the outer faces of the projections 212 and 214.

The bending members 50 and 52 are respectively connected to the supports 230 and 232 for movement therewith by means of two bolts 234, the shanks of which respectively pass through two vertically extending slots 236 respectively formed in the projections 212 and 214. The upper end of the support 230 is secured to a horizontal plate 238, while the upper end of the support 232 is formed as a block 240 which is slidably connected to the plate 238; the block 240 includes upper and lower parts 242 and 244 which are respectively in sliding contact with the lower and upper faces of the plate 238, and the parts 242 and 244 are connected by a narrow shank 246 (see FIGURE 2) which is a sliding fit in a slot 248 formed in the plate 238, the slot 248 extending in a direction parallel to the axes of the guide rods 62.

A bracket 250 is secured to the upper face of the plate 238, and the bracket 250 is pivotably connected to the relevant end of the lever 82 by means of a bolt 252, the shank of the bolt 252 passing through a slot 254 formed in the bracket 250. Thus, the lever 82 supports the plate 238, the supports 230 and 232, and the bending members 50 and 52, so that movement of the bending members 50 and 52 in a vertical direction is controlled directly by the lever 82 and hence by the cam 80. A further horizontal plate 256 is disposed above the plate 238, and a bracket 258 is formed integral with the front edge of the plate 256, the bracket 258 being pivotably connected to the lever 90 by means of a bolt 260 the shank of which passes through a slot 262 formed in the bracket 258. (It should be noted that, for the sake of clarity, the bracket 258 is shown attached to the rear edge of the plate 256 in FIGURE 2).

The forcing rod 54 passes through holes 264, 266 and 268 respectively formed in the plate 256, the plate 238 and the flange 222, and two bushes 270 and 272 are secured to the rod 54 by means of set screws 274, the bush 270 being disposed above the plate 238 and the bush 272 being disposed above the plate 256. A compressed spring 276 surrounds the rod 54, the ends of the spring 276 respectively bearing against the bush 270 and the underside of the plate 256. The rod 56 passes through a horizontally extending slot 278 (most clearly shown in FIGURE 2) formed in the plate 256, and through two holes 280 and 282 respectively formed in the block 240 and the flange 224. Two bushes 284 and 286 are secured to the rod 56 by means of set screws 288, the bush 284 being disposed above the plate 238 and the bush 286 being disposed above the plate 256, and a further compressed spring 290 surrounds the rod 56, the ends of the spring 290 respectively bearing against the bush 284 and the underside of the plate 256. It should be appreciated that vertical movement of the rods 54 and 56 is controlled by the lever 90 and hence by the cam 88, and that the rods 54 and 56 are urged resiliently downwards with respect to the plate 256 by means of the springs 276 and 290.

Referring particularly to FIGURE 9, two vertically extending grooves 292 are respectively formed in the inner faces of the bending members 50 and 52, each groove 292 being centrally disposed with respect to the relevant projection 226 or 228 and extending for the whole height of the inner face of the relevant member 50 or 52, while two further grooves 293 are respectively formed in the lower ends of the projections 226 and 228, the grooves 293 extending transversely to the grooves 292. The rods 54 and 56 are respectively in sliding contact with the inner faces of the members 50 and 52, and are respectively partly accommodated in the grooves 292.

The anvil arms 46 and 48 are respectively sliding fits in two horizontally extending holes 294 (see FIGURE 2) formed in the support members 58 and 60, the arms 46 and 48 also passing through a horizontally extending slot 296 formed in the base member 20. Each anvil arm 46 and 48 includes a narrow portion 298 (see FIGURE 10) adjacent its rear end so as to form a circumferential flange 300 at this end. The narrow portions 298 of the arms 46 and 48 pass through a horizontally extending slot 302 formed in a horizontally extending bar 304 disposed behind the base member 20. Normally, the bar 304 is resiliently maintained in contact with the rear face of the base member 20 by means of two springs 306 which respectively surround the shanks of two bolts 308 secured to the base member 20, the ends of each spring 306 respectively bearing against the bar 304 and against the head of the relevant bolt 308. It should be appreciated that movement of the anvil arms 46 and 48 in directions perpendicular to the base member 20 is controlled by the bar 304, and that, when the bar 304 is in contact with the base member 20, parts of the arms 46 and 48 are disposed beneath the forcing rods 54 and 56 (as shown in FIGURE 8).

Two guide blocks 310 are secured to the rear face of the base member 20, and two vertically extending bars 312 pass through, and are sliding fits with respect to, two holes 314 respectively formed in the blocks 310. The upper ends of the bars 312 are respectively formed integral with two bosses 316 which are secured to the plate 238 by means of bolts 318. Two inclined cam surfaces 320 are respectively formed on the bars 312, the cam surfaces 320 being disposed above two mating cam surfaces 322 which respectively form part of the bounding walls of two recesses 324 formed in the bar 304. It will be appreciated that the bars 312 are linked for vertical movement with the bending members 50 and 52, and the arrangement is such that, during a downward movement of the bending members 50 and 52, the cam surfaces 320 come into contact with the cam surfaces 322, continued downward movement of the bars 312 causing the anvil arms 46 and 48 to be urged rearwardly against the pressure of the springs 306 thereby retracting the arms 46 and 48 from beneath the forcing rods 54 and 56.

*Cutting and Clinching Mechanism*

The cutting and clinching mechanism will now be described with particular reference to FIGURES 11, 12 and 13. This mechanism includes two plates 326 and 328 which are disposed immediately below the insertion head 44 (as indicated in FIGURE 7) and which are respectively secured to two slide blocks 330 by means of a number of screws 332. The plate 326 has formed in it a line of seventeen holes 334 spaced apart by 0.1 inch and each large enough to receive a lead wire 16, while the plate 328 has a single hole 336 formed in it, similar to the holes 334. Each of the holes 334 and 336 is tapered to facilitate the insertion into it of the end of a lead wire 16 of a component 10.

The mechanism also includes a fixed block 338 which is secured to a support 340 by means of screws 342, the block 338 having a plane upper surface which is in sliding contact with the lower surfaces of the plates 326 and 328. The upper part of the block 338 is provided with a horizontally projecting flange 344, and a number of holes 346 are formed in the flange 344, the holes 346 having the same diameter as the narrower ends of the holes 334 and 336 and corresponding in position to the holes 334 and 336 (when the plates 326 and 328 are in their normal position as shown in FIGURE 11). The arrangement is such that, in operation, after the ends of the lead wires 16 of a component 10 have passed through the relevant pair of holes 18 of a panel 12, one of the lead wires 16 passes through the hole 336 and the corresponding hole 346 (the plates 326 and 328 being in their normal position), while the other lead wire 16 passes through the appropriate one of the holes 334 (depending on the spacing apart of the ends of the lead wires 16) and through the corresponding hole 346. The plates 326 and 328 are then moved together so that first the ends of the lead wires 16 are sheared off at the interface between the plates 326 and 328 and the fixed block 338, and then the remaining parts of the lead wires 16 projecting below the panel 12 are bent upwards, and towards each other, against the underside of the panel 12.

A horizontally extending recess 348 is formed in each slide block 330, and a horizontally extending projection 350 formed on the block 338 is a sliding fit in the recesses 348. Each slide block 330 is held in engagement with the block 338 by means of a bar 352 which fits into two further horizontally extending recesses 354 respectively formed in the slide blocks 330; the bar 352 is held in position by means of two screws 356 which respectively pass through two slots 358 formed in the slide blocks 330 and the ends of which are screwed into the fixed block 338, those parts of the screws 356 disposed inside the slot 358 being respectively surrounded by two bushes 360. It will be appreciated that the slide blocks 330 can be moved horizontally with respect to the fixed block 338, the amount of movement of each slide block 330 being limited by the length of the relevant slot 358.

The movable plates 326 and 328 are arranged to be actuated respectively by means of two levers 362 and 364 which are respectively secured to, and pivoted about the axes of, two spindles 366 and 367. The spindles 366 and 367 are respectively mounted in two horizontally extending bushes 368 mounted in the support 340, and are held in position by means of nuts 370. The lever 364 is provided with a projection 372 having a rounded end portion 374 which fits in a bifurcated portion 376 of the lever 362, the arrangement being such that when the lever 364 is pivoted about the axis of the spindle 367 the lever 362 is automatically caused to be pivoted in the opposite sense about the axis of the spindle 366. The levers 362 and 364 normally extend in a vertical direction, and the upper ends of the levers 362 and 364 are respectively formed as two rounded portions 378. The portions 378 respectively fit in two rectangular recesses 380 formed in two flanges 382 projecting downwardly from the slide blocks 362 and 364, the flanges 382 fitting over that side of the support 340 remote from the fixed block 338. Thus, when the lever 364 is pivoted in an anti-clockwise direction (with respect to FIGURE 11) and the lever 362 is pivoted in a clockwise direction, the two slide blocks 330 are moved together, and when the lever 364 is pivoted in a clockwise direction and the lever 362 is pivoted in an anti-clockwise direction the slide blocks 330 are moved apart. The lower ends of the levers 362 and 364 are urged together by means of a spring 384 the ends of which are respectively secured to two pins 386 secured to the levers 362 and 364 so that the levers 362 and 364 are biased towards the position shown in FIGURE 11, this being the normal position of the levers 362 and 364.

The lower end of the lever 364 is secured to one end of a spindle 388 disposed in a recess 390 formed in the support 340. The other end of the spindle 388 is secured to the corresponding end of the spindle 367 by means of a connecting strip 392, and the spindle 388 is held in position by means of nuts 394. One end of the rod 114 (see FIGURE 2) is arranged to bear against the spindle 388, the rod 114 passing through, and being a sliding fit with respect to, a horizontally extending hole 396 formed in the support 340.

The whole of the cutting and clinching mechanism described above is secured to a supporting member 398 by means of bolts 400, the supporting member 398 being secured to the table 170.

*Hopper and Feed Mechanism*

The mechanism for operating the hopper 32 will now be described with particular reference to FIGURES 2, 7 and 8. The hopper 32 is constituted by two parts 402 and 404, the parts 402 and 404 each being provided with a lug 406 at that end of the hopper 32 remote from the trough 24. Corresponding ends of two spindles 408 and 410 are respectively secured to the lugs 406, and two gear wheels 412 and 414 which are in engagement with one another are respectively secured to the spindles 408 and 410. The spindles 408 and 410 are rotatably mounted in bushes 416 secured in a supporting arm 418, the arm 418 being fixed to the base member 21.

One end of a lever 420 is mounted on a bush 422 secured to that end of the spindle 408 remote from the trough 24, and the other end of the lever 420 is pivotably connected to the lower end of a generally vertically extending lever 424. The upper end of the lever 424 is pivotably connected to a boss 426 secured by means of a bolt 428 to that end of the lever 74 remote from the camshaft 66; the upper end of the lever 424 is disposed in a vertically extending slot 430 formed in the boss 426, and is pivoted about a pin 432 passing through the boss 426. The spindle 76 about which the lever 74 is pivoted is secured by means of nuts 434 to a vertically extending support member 436 projecting from the base member 21.

The pusher members 40 and 42 of the feed mechanism 34 respectively include two slide blocks 438 and 440, the slide block 438 being mounted to slide along the rail 36 and a guide bar 442, and the block 440 being mounted to slide along the rail 38; the rail 36 and the bar 442 are respectively sliding fits in two horizontally extending recesses 444 formed in opposite vertical sides of the block 438, while the rail 38 is a sliding fit in a horizontally extending slot 446 formed in the base of the block 440 as is clearly shown in FIGURE 2. The guide bar 442 is secured to a support member 448 extending between the base members 20 and 21, the support member 448 being secured to the base members 20 and 21 by means of brackets 450. The rail 36 is connected to the support member 448 by means of two rods 452, while the rail 38 is connected to a movable support member 454 by means of two further rods 456. The movable support member 454 includes an upright portion 458 which is secured to the connecting rod 118 and which is slidably mounted on the guide rods 62, the rods 62 respectively passing through two holes 460 formed in the portion 458.

The slide block 440 is also slidably mounted on two horizontally extending and parallel guide rods 462 which project from the slide block 438, the rods 462 passing through two horizontally extending slots 464 respectively formed in the rails 36 and 38 and through two horizontally extending holes 466 formed in the slide block 440.

Two leaf springs 468 are respectively secured to the two slide blocks 438 and 440, the springs 468 respectively including two upright portions 470 which are adapted to engage with the leads 16 of a component 10 supported on the rails 36 and 38.

That end of the lever 96 remote from the camshaft 66 is pivotably connected to the slide block 438 by means of a bolt 472, the shank 474 of the bolt 472 passing through a slot 476 formed in the lever 96 and being screwed into the slide block 438. Thus, when the lever 96 is pivoted in a clockwise direction (with respect to FIGURE 8), the slide blocks 438 and 440 are moved towards the insertion head 44, the leaf springs 468 pushing a component 10 along the rails 36 and 38 and on to the anvil arms 46 and 48. The leads 16 of the component 10 are urged resiliently against the projections 212 and 214 by leaf springs 468 so as to locate accurately the leads 16 beneath the forcing rods 54 and 56.

*Rotating Disc Assembly*

Referring now particularly to FIGURES 14 and 15, the rotating disc assembly 116 includes two discs 478 and 480 mounted on the camshaft 66. Eight pairs of aligned holes 482 (which form an outer arc as clearly shown in FIGURE 15) are formed in the discs 478 and 480, while eight further pairs of holes 483 (forming an inner arc) are also formed in the discs 478 and 480. A number of pins 484 and 485 are slidably mounted in the holes 482 and 483, each pin 484 passing through a pair of the holes 482, and each pin 485 passing through a pair of the holes 483. (For the sake of clarity, only the pins 484 are shown in FIGURE 14.) Each pin 484 or 485 has a head 486, and a bush 488 is secured to that part of each pin 484 or 485 disposed between the two discs 478 and 480. Normally, the pins 484 and 485 are disposed with their ends flush with the rear face of the disc 480, but each pin 484 or 485 is capable of being moved through the relevant pair of holes 482 or 483 so that the end of the pin 484 or 485 projects beyond the rear face of the disc 480. The axes of the pins 484 and 485 are disposed at varying distances from the axis of the discs 478 and 480, the distances of the axes of the pins 484 from the axis of the discs 478 and 480 differing by 0.1 inch from one pin 484 to the next, the distances of the axes of the pins 485 from the axis of the discs 478 and 480 also differing by 0.1 inch from one pin 485 to the next, and the distance of the axis of the innermost pin 484 from the axis of the discs 478 and 480 being 0.1 inch greater than the distance of the axis of the outermost pin 485 from the axis of the discs 478 and 480.

A further pin 490 is slidably mounted in two further holes 492 formed in the discs 478 and 480, the distance of the axis of the pin 490 from the axis of the discs 478 and 480 being equal to the mean distance of the axes of the pins 484 and 485 from the axis of the discs 478 and 480. A plate 494 is secured to the front end of the pin 490, and a bush 496 is secured to that part of the pin 490 disposed between the discs 478 and 480. A compressed spring 498 surrounds the pin 490, the ends of the spring 498 respectively bearing against the bush 496 and against the rear face of the disc 478 so as to resiliently urge the pin 490 into the position shown in FIGURE 14 in which the rear end of the pin 490 projects beyond the rear face of the disc 480.

The connecting member 120 which forms part of the linkage between the movable support member 60 and the rotating disc assembly 116 includes a horizontally extending bar 500 and a transverse member 502 secured to the bar 500 by means of a bracket 504. The transverse member 502 is secured to the rod 118, and that part of the rod 118 disposed on that side of the member 502 remote from the insertion head 44 passes through, and is a sliding fit with respect to, a horizontally extending hole 506 formed in a guide block 508 secured to the base member 20. That end of the transverse member 502 remote from the rod 118 is secured to the movable support member 454 by means of a rod 510 (also shown in FIGURE 8), the rod 510 being a sliding fit in a hole 512 formed in a support plate 514 secured to the supporting arm 418.

The bar 500 is slidably mounted between a first pair of rollers 516 disposed one above the other and between a second pair of rollers 518 also disposed one above the other, the rollers 516 and 518 being respectively mounted on spindles 520 secured to the base member 21. A plate 522 and a horizontally extending bar 524 are secured to the bar 500, the plate 522 and the bar 524 being disposed immediately behind the disc 480. Two cam surfaces 526 and 528 are respectively formed on the plate 522 and the bar 524, the cam surfaces 526 and 528 sloping downwardly towards each other, and a gap 530 being formed between the lower ends of the surfaces 526 and 528. A further inclined cam surface 532 (clearly shown in FIGURE 2) is formed at the lower edge of the bar 524. An elongated recess 534 is formed in the lower edge of the combination of the bars 500 and 524, the purpose of the recess 534 being to accommodate the camshaft 66 and to allow a certain amount of movement of the bar 500 in a direction transverse to the axis of the camshaft 66.

One end of a lever 536 is pivoted about a spindle 538 secured to a block 540 fixed to the base member 21, part of the lever 536 being located in a vertically extending slot 542 formed in a guide member 544 carried on the bar 500. A follower roller 546 is mounted on the lever 536 approximately midway along its length, the roller 546 bearing against a cam 548 mounted on the camshaft 66. The roller 546 is urged resiliently against the cam 548 by means of a spring 550 the ends of which are respectively connected to that end of the lever 536 remote from the spindle 538 and to a peg 552, the peg 552 being secured to a support member 554 extending between the base members 20 and 21. A block 556 having a downwardly projecting tooth 558 is secured to the lever 536, and a plate 560 having a serrated upper edge is secured to the bar 500 below the block 556, the serrations being regularly spaced at intervals of 0.1 inch; the arrangement is such that, when the follower roller 546 is in contact with that part of the cam 548 of lesser radius, the tooth 558 is in engagement with one of the serrations of the plate 560, and that, when the roller 546 is in contact with that part of the cam 548 of greater radius, the tooth 558 is out of engagement with the serrations of the plate 560.

Two electromagnet assemblies 562 and 564 are mounted on a support plate 566 secured to, and projecting above, the base member 21. The electromagnet assemblies 562 and 564 respectively include two actuating arms 568 and 570 which are respectively pivotably linked at their ends to two rods 572 and 574, the rods 572 and 574 respectively passing through two bush bearings 576 secured to the plate 566 and through two holes 578 formed in the plate 566. Two striker arms 580 and 582 are respectievly secured to the free ends of the rods 572 and 574. When the electromagnet 562 is energised, the rod 572 is moved by the actuating arm 568 toward the disc 478 so as to cause the striker arm 580 to strike the head 486 of one of the pins 484, and similarly, when the electromagnet assembly 564 is energised, the rod 574 is moved by the actuating arm 570 towards the discs 478 so as to cause the striker arm 582 to strike the head 486 of one of the pins 485.

During each revolution of the camshaft 66, one of the electromagnet assemblies 562 and 564 is arranged to be energized when one of the pins 484 and 485 is opposite the relevant striker arm 580 or 582, and it will be appreciated that the particular pin 484 or 485 which is moved is dependent upon the point during the revolution of the cam shaft 66 at which the electromagnet 562 or 564 is energised. That pin 484 or 485 which has been actuated comes into contact with one or the other of the cam surfaces 526 or 528, and, as the discs 478 and 480 continue to rotate, the bar 500 will be moved one way or the other by the actuated pin 484 or 485 depending on which cam surface 526 or 528 is in engagement with the actuated pin 484 or 485. The actuated pin 484 or 485 then passes through the gap 530, at which point the bar 500 is in its required position with respect to the discs 478 and 480, and continued rotation of the cam shaft 66 causes the actuated pin 484 or 485 to strike the cam surface 532, the actuated pin 484 or 485 being thereby restore to its original position. It will be appreciated that, prior to the bar 500 being moved by one of the pins 484 or 485, it is restored to a mean position relative to the discs 478 and 480 by means of the pin 490.

*Electrical Control System*

The electrical circuit arrangements associated with the punched card reader (not shown) will now be described with reference to FIGURES 16, 17, 18 and 19. The punched card reader translates the information contained in the punched card into a series of electrical conditions appearing on a number of contacts 584 to 592 (FIGURES 16 and 18), each such condition being the presence or absence of a marking signal (in this case ground) on the relevant one of the contacts 584 to 592. The electrical conditions appearing on the contacts 584 to 588 (FIGURE 16) control the operation of a number of relays A/2, B/3, C/5, D/5, DA/4, E/5 and EA/4 which in turn control the energisation of the solenoids 593 to 615 (FIGURE 17) of the electromagnet assemblies 158, while the contacts 589 to 592 (FIGURE 18) control the operation of further relays F/2, G/3, H/5, J/5 and JA/4 which in turn control the energisation of the solenoids 616 and 617 (FIGURE 19) of the electromagnetic assemblies 562 and 564. Certain of the sets of contacts of the relays have two fixed contacts, and in such cases the terms "back contact" and "front contact" will hereafter be used, the term "back contact" being used to designate that fixed contact of a set of contacts which is isolated from the associated movable contact upon operation of the relevant relay, and the term "front contact" being used to designate that fixed contact of a set of contacts with which the associated movable contact is brought into engagement on operation of the relevant relay.

Referring now particularly to FIGURES 16 and 17, the contacts 584 to 588 are respectively connected via the coils 618 to 622 of the relays A, B, C, D and E to the negative terminal of a battery 624, the positive terminal of which is grounded. The coils 625 and 626 of the relays DA and EA are respectively connected in parallel with the coils 621 and 622. It will be appreciated that, if a marking signal (ground) appears on any one of the contacts 584 to 588, the relevant relay or relays will be operated. Those terminals of the coils 618, 619, 620, 621, 622, 625 and 626 remote from the battery 624 are connectable to ground via a mechanically operated springset 628. When the relay A, B, or C is operated by virtue of a marking signal appearing on the relevant contact 584, 585 or 586, the relevant contact A1, B1 or C1 closes so that the relevant terminal of the coil 618, 619 or 620 is maintained at ground (even when a marking signal has disappeared from the relevant contact 584, 585 or 586) providing that the springset 628 is operated. Similarly, when the relays D and DA are operated, the relevant terminals of the coils 621 and 625 can be maintained at ground potential by virtue of the contact D1 closing, and, when the relays E and EA are operated, the relevant terminals of the coils 622 and 626 can be maintained at ground potential by virtue of the contact E1 closing.

Energisation of each of the solenoids 593 to 615 is brought about by completing a circuit including the relevant solenoid between ground and the negative terminal of a battery 630 the positive terminal of which is grounded. Each of the solenoids 593 to 615 is connectable between ground and the negative terminal of the battery 630 via a mechanically operated springset 632 and via various contacts of the relays A, B, C, D, DA, E and EA, that one of the solenoids 593 to 615 which is energised being dependent upon which of the relays A, B, C, D, DA, E and EA are operated. Thus, for example, that terminal of the solenoid 593 remote from the battery 630 is connectable to ground via the front contact D2, the back contact C2, the back contact B2 and the back contact A2 so that the solenoid 593 will be energised if the relay D is operated and the relays A, B, C and E are inoperative, that is to say if a marking signal appears on the contact 587 but not on the contacts 584, 585, 586 and 588. Considering another example, that terminal of the solenoid 603 remote from the battery 630 is connectable to ground via the front contact E3, the front contact DA1, the back contact C4, the back contact B3 and the front contact A2, so that the solenoid 603 will be energised if the relays A, DA and E are operated and the relays B and C are inoperative, that is to say if marking signals appear on the contacts 584, 587 and 588, but not on the contacts 585 and 586.

Referring now particularly to FIGURES 18 and 19, the contacts 589 to 592 are respectively connected via the coils 634, 635, 636 and 637 of the relays F, G, H and J to the negative terminal of a battery 638 the positive terminal of which is grounded. The coil 640 of the relay JA is connected in parallel with the coil 637. Those terminals of the coils 634, 635, 636, 637 and 640 remote from the battery 638 are connectable to ground via a mechanically operated springset 642. When the relay F, G, or H is operated by virtue of a marking signal appearing on the relevant contact 589, 590 or 591, the relevant relay contact F1, G1 or H1 closes so as to maintain the relevant terminal of the coil 634, 635 or 636 at ground potential (providing that the springset 642 is closed), and similarly, when the relays J and JA are operated by virtue of a signal appearing on the contact 592, the contact J1 closes so as to enable the relevant terminals of the coils 637 and 640 to be maintained at ground potential.

The energisation of the solenoids 616 and 617 is controlled by means of two commutators 644 and 646, the wiper arm 648 of the commutator 644 being arranged to wipe over a series of contacts 650 to 657 which respectively correspond to the pins 484, and the wiper arm 658 of the commutator 646 being arranged to wipe over a further series of contacts 660 to 667 which respectively correspond to the pins 485. The rotation of the wiper arms 648 and 658 is controlled by the camshaft 66, and the arms 648 and 658 are synchronised so as simultaneously to wipe over the contacts 650 to 657 and 660 to 667; the arm 648 is arranged to be in contact with one of the contacts 650 to 657 when the striker arm 580 (see FIGURE 15) is opposite the relevant one of the pins 484, and the arm 658 is arranged to be in contact with one of the contacts 660 to 667 when the striker arm 582 is opposite the relevant one of the pins 485. The arm 648 is connectable via the solenoid 616 and a mechanically operated springset 668 to the negative terminal of a battery 670 the positive terminal of which is grounded, while the arm 658 is connectable to the negative terminal of the battery 670 via the solenoid 617 and a further mechanically operated springset 672.

The contacts 650 to 657 and 660 to 667 are each connected via various contacts of the relays F, G, H, J and JA to ground, and, in operation, during each cycle of rotation of the camshaft 66, ground potential is applied to a particular one of the contacts 650 to 657 and 660 to 667 depending upon which of the relays F, G, H, J and JA are operated. For example, the contact 660 is connectable to ground via the back contact J2, the back contact H2, the back contact G2 and the back contact F2 so that ground potential is applied to the contact 660 if all the relays F, G, H, and J are inoperative, that is to say if no marking signal appears on any of the contacts 539 to 592. Considering another example, the contact 652 is connectable to ground via the back contact JA2, the front contact H4, the back contact G3 and the front contact F2, so that ground potential is applied to the contact 652 if the relays G and JA are inoperative and the relays F and H are operated, that is to say if marking signals appear on the contacts 539 and 591 but not on the contacts 590 and 592. It will be appreciated that, when the wiper arm 648 is in contact with one of the contacts 650 to 657 which is at ground potential, the electromagnet 562 will be energised (providing the springset 668 is closed) thereby causing the relevant one of the pins 484 to be moved, and that when the wiper arm 658 comes into contact with one of the contacts 660 to 667 which is at ground potential the electromagnet assembly 564 will be energised (providing the springset 672 is closed) thereby causing the relevant one of the pins 485 to be moved.

The springsets 628, 632, 642, 668 and 672 are all arranged to be operated by means of cams (not shown) mounted on the camshaft 66.

*Operation of the Electrical Control System*

The cycle of operation of the electrical system (which corresponds to one revolution of the camshaft 66) is as follows. Firstly, the punched card is stepped through the punched card reader so as to present to the punched card reader information determining the next component 10 to be mounted by the machine and any appropriate adjustment of the spacing apart of the support members 58 and 60 which may be necessary to enable the feed mechanism 34 and the insertion head 44 to deal with this component 10. The punched card reader then senses this information and applies an appropriate series of marking signals for a short period to the contacts 584 to 592, thereby causing the appropriate ones of the relays A, B, C, D, DA, E, EA, F, G, H, J and JA to operate.

Immediately after these relays have been operated, the springset 632 is closed for a short period, thereby causing a component 10 to be dropped into the trough 24 from the appropriate magazine 22. The springset 628 is closed prior to the punched card reader sensing the information contained on the punched card and remains closed until after the releasing operation has been completed, but it is opened during a part of the remainder of the cycle so as to cause the relays A, B, C, D, DA, E and EA to return to their inoperative conditions prior to the beginning of the next cycle of operation of the electrical system.

After an eighth of a cycle has elapsed from the release of a component 10 from one of the magazines 22, the wiper arms 648 and 658 come into contact with the first contacts 650 and 660 of the banks of contacts respectively associated with the arms 648 and 658 and the arms 648 and 658 respectively traverse the contacts 650 to 657 and 660 to 667 during the next quarter of a cycle. The springsets 668 and 672 are closed for a part only of each period during which the wiper arms 648 and 658 are in contact with a pair of the contacts 650 to 657 and 660 to 667, so that each springset 668 or 672 is closed and opened eight times during this quarter of a cycle. The closing of the springsets 668 and 672 is synchronised with the periods during which the striker arms 580 and 582 are opposite a pair of the pins 484 and 485, so that while one of the arms 648 and 658 is in contact with that one of the contacts 650 to 657 and 660 to 667 which has a marking signal applied to it, the appropriate one of the pins 484 and 485 will be actuated when the springsets 668 or 672 close. The springset 642 is closed prior to the arms 648 and 658 coming into contact with the contacts 650 and 660, and remains closed until after the arms 648 and 658 have wiped over the last contacts 657 and 667 of the banks of contacts, but the springset 642 is thereafter temporarily opened so as to cause the relays F, G, H, J and JA to return to their inoperative condition before the next set of marking signals is applied to the contacts 584 to 592.

*Operation of the Mechanical Parts of the Machine*

The sequence of operation of the various mechanical parts of the machine during one complete cycle (which corresponds to one revolution of the camshaft 66) will now be described in detail. For convenience, this cycle will be described as beginning at a point nearly halfway through the previously described cycle of operation of the electrical system, this point occurring shortly before the wiper arms 648 and 658 complete their traverses over the banks of contacts 650 to 657 and 660 to 667.

At the beginning of the cycle, the bending members 50 and 52 and the forcing rods 54 and 56 are fully raised, the lower portion 28 of the swinging arm 26 is at the extreme left (with respect to FIGURE 2) of the trough 24, a component 10 being in position in the trough 24, the hopper 32 is closed, the feed mechanism 34 is in its fully retracted position with respect to the insertion head 44, the movable plates 326 and 328 of the cutting and clinching mechanism are in their normal positions as shown in FIGURE 11, the bar 500 is in its central position, and the tooth 558 is out of engagement with the serrated plate 560.

During the first part of the cycle, the lower portion 28 of the swinging arm 26 is moved to its extreme right-hand position thereby pushing the component 10 supported in the trough 24 on to the hopper 32; while the component 10 is being moved on to the hopper 32, the bar 500 is moved into its required position by means of the rotating disc assembly 116; it will be appreciated that the beginning of that part of the cycle during which the bar 500 may be moved corresponds to the point at which the first pair of pins 484 and 485, that is to say the extreme left-hand pins 484 and 485 (with respect to FIGURE 15), is opposite the entry of the space between the cam surfaces 526 and 528, and that the end of this part of the cycle corresponds to the point at which the last pair of pins 484 and 485 is opposite the gap 530. The movement of the bar 500 brings about a movement of the movable support member 60 and the pusher member 42, and after the movement of the bar 500 has been completed, the bending members 50 and 52, the forcing rods 54 and 56, the anvil arms 46 and 48, and the rails 36 and 38 are spaced apart by the required amounts to enable them to deal with the particular size of component 10 contained in the hopper 32. The tooth 558 is then caused to come into engagement with the serrated plate 560 thereby locking the bar 500 in position and consequently also locking in position the bending member 52, the forcing rod 56, the anvil arm 48, and the rail 38. At this stage, the swinging arm 26 commences to swing back to its original position, the arm 26 reaching this position before the next component 10 is caused to drop from one of the magazines 22 into the trough 24.

After the various parts of the machine have been thus locked in position, the hopper 32 opens, thereby allowing the component 10 contained in the hopper 32 to drop into the feed mechanism 34, the leads 16 of the component 10 being respectively supported on the rails 36 and 38. The pusher members 40 and 42 then push the component 10 along the rails 36 and 38 and on to the anvil arms 46 and 48, and shortly afterwards the pusher members 40 and 42 return to their original positions.

The forcing rods 54 and 56 then descend slightly so as to trap the wires 16 resiliently between the lower ends of the rods 54 and 56 and the anvil arms 46 and 48 as indicated in FIGURE 7, and at the same time the bending members 50 and 52 begin to descend. During the descent of the bending members 50 and 52, the lower ends of the members 50 and 52 first come into contact with those parts of the wires 16 projecting beyond either side of the anvil arms 46 and 48, the wires 16 fitting into the grooves 293 formed in the lower ends of the projections 226 and 228. Continued downward movement of the bending members 50 and 52 causes the outermost parts of the wires 16 to be bent downwardly over the anvil arms 46 and 48, these outermost parts of the wires 16 sliding into the vertical grooves 292 formed in the members 50 and 52, so as to form a right-angled bend in each of the wires 16. Prior to the bending members 50 and 52 reaching their lowermost position, the forcing rods 54 and 56 are raised slightly so that the wires 16 are no longer gripped between the rods 54 and 56 and the anvil arms 46 and 48, and the anvil arms 46 and 48 are retracted from beneath the rods 54 and 56 by virtue of the cam surfaces 320 formed on the bars 312 coming into contact with the cam surfaces 322 formed on the bar 304; at this stage the component 10 is held in position by virtue of the wires 16 tightly fitting in the grooves 292. After the wires 16 have been fully bent, the forcing rods 54 and 56 descend again so as to move the component 10 downwards with the downwardly projecting parts of the wires 16 sliding in the grooves 292, the ends of the wires 16 passing into the relevant pair of holes 18 in the panel 12 which has been previously moved into its required position beneath the insertion head 44; at this stage the bending members 50 and 52, the forcing rods 54 and 56 and the component 10 are as shown in FIGURE 9. The forcing rods 54 and 56 continue to move downwards until the body 14 of the component 10 comes into contact with the panel 12; it will be appreciated that the fact that the rods 54 and 56 are urged resiliently downwards under the pressure exerted by the springs 276 and 290 enables the insertion head 44 to insert components 10 whose bodies 14 vary considerably in diameter. The movable plates 326 and 328 of the cutting and clinching mechanism are then moved together so as to first cut the leads 16 to the required length and then bend over the remaining portions of the leads 16 projecting beneath the panel 12 against the appropriate parts of the metallic pattern of the panel 12, the plates 326 and 328 being returned shortly afterwards to their original positions.

After the component 10 has been thus mounted on the panel 12, the forcing rods 54 and 56 return to their uppermost positions, and immediately afterwards the bending members 50 and 52 are also raised to their uppermost positions, the anvil arms 46 and 48 being thereby caused to be moved back into position beneath the forcing rods 54 and 56. At the same time, the tooth 558 comes out of engagement with the serrated plate 560, and shortly afterwards the pin 490 strikes one or other of the cam surfaces 526 and 528, causing the bar 500 to be returned to its central position.

The next cycle of operations begins almost immediately after the completion of the operations described in the preceding paragraph, the panel 12 being moved into another position beneath the insertion head 44 and another component 10 being mounted on another part of the panel 12. It should be noted that one component 10 is mounted on the panel 12 for each revolution of the camshaft 66, although the total time which elapses between the release of a component 10 from one of the magazines 22 and its mounting on the panel 12 corresponds to about one and a quarter revolutions of the camshaft 66.

It should be appreciated that the present invention provides machines for mounting electrical components on printed circuit panels which can handle components whose bodies vary considerably in dimension. The machine described above is capable of handling components the lengths of whose bodies may vary between 0.5 inch and 2 inches and whose bodies can have any diameter up to 0.75 inch.

We claim:

1. A machine of the kind designed to mount on base members electrical components each having a body from which a pair of wire leads project in opposite directions: said machine including, an insertion head comprising two bending mechanisms respectively operable to bend the two leads of an electrical component so that the ends of the leads are pointed towards a base member on which the component is to be mounted, a reciprocable forcing mechanism for moving a component towards the base member after its leads have been bent, and automatically controllable means for adjusting the spacing apart of the two bending mechanisms in a direction perpendicular to the direction of reciprocation of the forcing mechanism; means for feeding a series of components, at least some of which have bodies of considerably different lengths, one at a time in a preselected sequence to the insertion head; and means for automatically controlling the operation of said adjusting means in accordance with said sequence so as to enable the insertion head to mount said sequence of components in turn on a base member, said means for automatically controlling the operation of the adjusting means including a rotatable support system having a number of pins slidably mounted on said system at varying distances from the axis of rotation of said system, a movable member disposed adjacent said system and adapted to actuate said adjusting means, means for moving a pre-selected one of said pins into an actuating position such that subsequent rotation of said system causes said one of said pins to engage with and move said movable member by such an amount as to set the spacing apart of the two bending mechanisms to an appropriate value, means for rotating said system during each cycle of operation of the machine by such an amount as to cause said one of said pins to bring about the appropriate setting of the spacing apart of the bending mechanisms, and means for returning said one of said pins to its normal position after the spacing apart of the two bending mechanisms has been set to said appropriate value.

2. A machine according to claim 1, in which the means for controlling the operation of the adjusting means includes: means operative to lock the movable member in position after the spacing apart of the two bending mechanisms has been set to said appropriate value; and means for actuating said locking means whereby said locking means is operative for the whole of that part of each cycle of operation of the machine for which the insertion head is mounting a component on a base member.

References Cited in the file of this patent

UNITED STATES PATENTS

| | | |
|---|---|---|
| 1,982,743 | Kleinschmit | Dec. 4, 1934 |
| 2,778,691 | Hazel | Jan. 22, 1957 |
| 2,829,371 | Sittner | Apr. 8, 1958 |
| 2,848,718 | Hancock | Aug. 26, 1958 |
| 2,856,998 | Hancock | Oct. 21, 1958 |
| 2,893,006 | Stuhre | July 7, 1959 |
| 2,911,646 | Vossen | Nov. 10, 1959 |
| 2,982,967 | Dingelstedt | May 9, 1961 |